Dec. 17, 1935.  A. F. NORTON  2,024,471

TEMPERATURE REGULATING DEVICE

Filed March 30, 1934

INVENTOR,
Aaron F. Norton;
BY
ATTORNEY

Patented Dec. 17, 1935

2,024,471

UNITED STATES PATENT OFFICE 2,024,471

TEMPERATURE REGULATING DEVICE

Aaron F. Norton, Los Angeles, Calif.

Application March 30, 1934, Serial No. 718,222

1 Claim. (Cl. 200—138)

This invention relates to temperature regulating devices of the character adapted to control the temperature of a selected electrically heated element.

An object of the invention is the provision of a novel device which is adapted to control the temperature of any electrically heated device, such as an electric iron, heating pad, stove, or the like, which initially was not provided with any heat-regulating means.

Electric irons incorporating thermostats are costly and subject to many ills, necessitating repairs, all of which are avoided with the present invention. With my invention I provide a novel means which may be directly connected with an electric iron of the conventional type, which is to say, one without integrally formed heat-control elements. My invention, in its simplest embodiment, may take the form of an electric plug adapted to be received within the electric socket of an iron. It is well known that electric irons now on the market are provided with a socket adapted to receive an electric plug, whereby a suitable source of electrical current supply may be fed to the iron for the purpose of electrically heating the same. With my invention, the plug is so formed as to confine some heat responsive means, such as a thermostat, which will disconnect the current supply when a given iron temperature has been reached, and maintain said current "off" until the temperature of the iron has dropped to a selected degree, whereupon the electric current supply is again restored through the iron.

The device of the present invention is simple of construction, inexpensive in cost to manufacture, is so constructed as to permit its use with any standard form of electric iron, or standard forms of electrically heated devices having sockets or plugs of a given "standard." The device is useful for a variety of purposes, and may, in one instance, regulate the temperature of an electric iron, in a second instance, and with the same device, regulate the temperature of a waffle iron, in other instances the temperature of a heater, and so on ad infinitum.

With the above mentioned and other objects in view, the invention consists in the novel and useful provision, formation, construction, interrelation and association of parts, members and features, all as disclosed in one embodiment in the accompanying drawing, described generally, and more particularly pointed out in the claim.

In the drawing:

Fig. 1 is a side elevation showing an iron incorporating the invention.

Fig. 2 is an elevation looking in the direction of the arrows 2—2 of Fig. 1.

Fig. 3 is a fragmentary view on the line 3—3 of Fig. 1; and

Fig. 4 is a sectional view on the line 4—4 of Fig. 3.

Referring now with particularity to the drawing, at 1 I have shown an electrical iron of the conventional type, which is to say said iron includes a casing 2, within which are confined wire coils (not shown), the coil ends of which terminate at the heel 3 of the iron, and which portion is provided with a pair of conduit prongs 4 and 5. Ordinarily the prongs are surrounded by some form of guard constituting a socket element such as shown, for one type, at 6, which said element, in the present instance, is secured to a portion of the handle frame, designated generally as 7. This socket element or guard may be extended in length and secured to the heel portion 3. In order to feed electricity to the iron, it is customary to provide an elongated conducting cord carrying at one end a socket adapted to receive the conduit prongs of the iron, the other end of the cord being provided with a plug which may be inserted within the current supply outlet. Such an electric iron will become quite hot if the source of current supply is allowed to be constantly fed to the iron, with the result that the socket must be removed from the iron or the plug disconnected from the outlet. The present invention does not disturb the construction of the iron in the least, but in place of utilizing the ordinary form of conduit cord I utilize a heat-responsive element so constructed and arranged, and combined, or capable of being combined, with the electric iron as to allow the current to be fed to the electric iron under control, to the end that a selected temperature of the iron may be maintained. In carrying out the invention, the ordinary form of electric conducting cord or conduit 8 may be utilized, one end of the conducting elements of the cord being joined with a plug 9, the prong portions of which are adapted to be inserted within an outlet leading to a source of current supply. The opposite end of said cord leads to the means 10, which said means control the passage of electric current to the iron 1. This means may be any form of thermostat, and I have illustrated the construction of one form of thermostat in Figs. 3 and 4.

Referring to Figs. 2, 3, and 4, the means 10 includes a casing 11 formed in two parts 12 and 13. The meeting face portions of said parts are recessed at 14 and 15 to provide a chamber 16. The part 13 is formed with an enlargement 17 which is chambered at 18, said chamber communicating with the chamber 16. Within the chamber portion 16 is adapted to be confined the heat-responsive means constituting a thermostatically controlled switch. The thermostat 17, in the present instance, comprises a bimetal member secured at one end to a suitable bracket 18, the bracket in turn being fastened to one of the casing parts, as, for instance, the part 12, at 19. The opposite end of said bimetal element is curved slightly, as shown at 20. As is ordinary practice in devices of this character, one of the metal members has a greater rate of expansion than the other, with the result that when the metal is heated the thermostat will bend.

The switch is shown at 21, and includes a pair of spaced arms 22 and 23 insulated apart at one of their ends and secured to a bracket 24, the bracket in turn being carried by the part 12 of the casing, as shown at 25. The bracket 24 is provided with an extension 26, and with a portion 27 in substantially right angular relationship to the extension 26. The portion 27, in turn, has an angular extremity 28. This extremity is formed with a transversely threaded bore 29. It will be noted that the extremity 28 is within the chamber 18 of the enlargement 17. A hand knob 30, external the enlargement 17, carries a shank 31 passed through the part 32 of the enlargement, which shank, in turn, is secured to a screw 33 in threaded engagement with the threaded bore 29. This screw has a reduced diameter portion 34 carrying an insulated head 35.

The arms 22 and 23 are provided with contacts or points 36 and 37 adapted for co-engagement under certain conditions, as hereinafter outlined. The arm 22 is of greater length than the arm 23, and the curved end portion of the thermostat terminates adjacent the end of the arm 22. Thus a given degree of movement of the thermostat will cause said thermostat to engage said arm 22 to move the same. In this connection it may be pointed out that both of the arms 22 and 23 are formed of spring-like or resilient material. Both parts of the casing are provided with elongated grooves 38 and 39, so positioned as to lie on opposite sides of the chamber 16. The elongated grooves of the said casing parts, when said parts are in juxtaposition, are in complementary arrangement. It is to be observed that the said grooves vary as to diameter or width, the portion of said grooves inward from the end 40 of the casing being of greater transverse dimension than the remaining portions thereof, as indicated generally for all of said grooves by the numerals 41 and 42. Within the groove 38 is an elongated electrical conducting strap 43, which strap carries a socket 44 within the portion 41 of the groove. The groove 39 likewise is adapted to confine a strap 45 carrying within the portion 41 of said groove 39 a socket 46. A conducting strap 47 is secured to the strap 45 and is in electrical connection with the arm 23. A second electrical strap 48 is in electrical connection with the arm 22, the strap 48 being secured to a strap 49. In this regard it may be noted that the casing parts are grooved sufficiently to allow the straps 47 and 48 to be received between the groove 39 and the chamber 16. Both the straps 43 and 49 carry binding screws or the like, 50. Both parts 12 and 13 are recessed as shown at 51 and 52, and furthermore the parts are undercut as shown at 53 to receive an annular coil 54 forming an end member of a wire coil 55. The cord 8 is passed through the confines of the said coil 55, with ends of said cord confined in slots forming a continuation of the recess 51. As is usual, the cord contains two wires, and one wire is secured to the strap 43 through the medium of the binding screw 50, and the other wire is secured by similar means to the strap 49. The wire coil 55 acts as a guard for the cord 8, and to prevent sharp bending of the cord at a zone adjacent the thermostatic plug.

Both casing parts 12 and 13 are bored, whereby the casing parts, through the medium of some securing means, may hold the parts in cooperative relationship. More particularly, the said casing parts are bored at 56 and 57, and likewise provided with surface recesses at said bores, whereby a screw 58 may be passed through said bores to secure said parts when a nut is threaded to the screw. Both parts are likewise provided with transverse bores shown at 59 and 60, and securing means such as screws are adapted to be passed through the said bores and held by nuts.

The operation, uses and advantages of the invention are as follows:

It will be observed that the parts are of easy assemblage within the casing, for which reason inspection of the moving parts may be readily made, in the event repairs become necessary. If an electric iron is the implement to be used, the thermostatic plug will receive the prong elements 4 and 5 of said iron within the contact socket portions of the plug. These prongs will engage the members 44 and 46 and permit electrical current to pass through the heating coil of the iron 1. If it is desired to regulate the temperature of the iron, temperature regulation is secured by turning the knob 30 in one of two directions. Heat from the iron is conducted to the prongs 4 and 5, and as the bimetal thermostat 17 is in the direct zone of heat conduction to the prongs, the thermostat will move in accordance with the temperature of the iron. If the iron is to be maintained quite hot the knob 30 should be rotated clockwise, viewing Figure 2, which will, through the medium of the insulated head 34, press the contact arm 23 inwardly, which movement in turn will cause the arm 22 to move clockwise, viewing Fig. 4, due to the fact that the points 36 and 37 are in engagement. Thus the curved end 20 of the thermostatic element must move a greater distance than would be indicated upon viewing Fig. 4 before said curved end would contact with the end portion of the arm 22. After a given movement of the thermostat against the arm 22 the contacts 36 and 37 will be separated, breaking the current supply to the iron. As the iron cools the thermostatic element 17 will gradually tend to assume the position shown in Fig. 4, whereupon the contacts 36 and 37 will again engage and complete the electrical circuit to the iron. Thus, if the knob 30 is turned anti-clockwise, the end of the arm 22 may be brought nearer the thermostat 17, to the end that slight movement thereof will readily break the current to the iron.

As before stated, uses for the invention will readily suggest themselves to one equipped with the device. The outer face of the enlargement may be graduated, if desired, and the said knob 30 may be provided with a pointer for play over said graduations. It is apparent that the invention may be utilized with any type of heating element wherein a cord is utilized for conducting electricity to said element.

While I have not shown one of the members 44 or 46 as directly secured to the bracket 18 holding the thermostatic element 17, yet it is apparent that this construction may be resorted to, to the end that the thermostatic element is directly effected by the conduction of heat thereto. In the present instance the invention is shown as having the thermostatic element independent of the members 44 and 46 and the prongs 4 and 5. Thus the thermostatic element will be affected by heat radiated thereto from the prongs and/or the members 44 and 46. Further, the construction is such that there is communication between the portions 41 and the chamber 16 housing the thermostat 17.

I claim:

In a thermostatic plug, a pair of terminals, a pair of spring contact arms, a thermostatic member mounted in the plug for engagement, when heated, with one of said contact arms for disengaging the contacts of said arms at a predetermined degree of heat, a bracket in said plug, a screw in threaded engagement with said bracket, a head on one end of said screw for engaging one of said spring contacts, a knob on said plug formed with a shank, means for coupling the adjoining ends of said screw and said shank for enabling said knob, when turned, to turn said screw and cause the head of said screw to engage one of said spring contacts for adjusting the position of the other spring contact at which it will be engaged by said thermostat member, when heated, one of said spring contacts being connected to one of said terminals, the other spring contact being connected to one strand of a cord conductor, the other terminal being connected to the other strand of said conductor cord.

AARON F. NORTON.